United States Patent [19]

Garbrick

[11] Patent Number: 4,860,440

[45] Date of Patent: Aug. 29, 1989

[54] TOOL AND METHOD FOR ASSISTING THE EXTRACTION OF A WIRE FROM A CONNECTOR

[76] Inventor: Randy Garbrick, 6710 8th Ave. N.W., Seattle, Wash. 98117

[21] Appl. No.: 202,550

[22] Filed: Jun. 6, 1988

[51] Int. Cl.[4] ........................ H01R 43/00; B23P 19/00

[52] U.S. Cl. ........................................ 29/825; 29/764; 29/278; 29/739

[58] Field of Search .................. 29/278, 739, 764, 825

[56] References Cited

U.S. PATENT DOCUMENTS 3,087,235 4/1963 Porter .................................. 29/278
3,137,062 6/1964 Green et al. ....................... 29/764 X
3,210,832 10/1965 Kalen ................................ 29/278 X
3,222,766 12/1965 Camargo .............................. 29/764
3,325,884 6/1967 Bligat et al. ...................... 29/764 X
3,380,141 4/1968 Rofer ................................ 29/278 X
3,460,229 8/1969 Crew et al. ........................... 29/739

*Primary Examiner*—Howard N. Goldberg
*Assistant Examiner*—Carl J. Arbes
*Attorney, Agent, or Firm*—Russell W. Illich

[57] ABSTRACT

A tool for assisting the removal of a wire from an electrical connector that has a handle portion and a shaft portion. The wire is removed from the connector via a process which involves sliding a first tool over the wire and into a hole within a rear side of the connector, spreading a sleeve within the hole, and inserting the tool of the present invention into the front side of the connector to push the wire out of the rear hole of the connector. First and second embodiments of the tool are provided for assisting in wire removal from female and male connector heads, respectively.

6 Claims, 3 Drawing Sheets

TOOL AND METHOD FOR ASSISTING THE EXTRACTION OF A WIRE FROM A CONNECTOR

BACKGROUND OF THE INVENTION

This invention relates to the field of electrical connectors and in particular to connectors of cables that connect various computer devices. Currently, the removal of individual wires from the connector head of cables is performed by inserting an extractor tool into one of the receptor holes along the rear side of the connector head and drawing the wire from the receptor hole. This process has been proven difficult at times when the extractor tool slips from the wire as it is being extracted. Since the standard connector head within the computer industry involves 25 pins, or 25 wires, these difficulties can become quite time consuming for someone who works within the field of servicing computers. Hence, there has been a need within the electrical wiring field for a tool that extracts wires in a faster and more efficient manner.

SUMMARY OF THE INVENTION

The present invention solves the problems associated with extracting wires from connector heads. The invention involves using a second tool along with the standard extraction tool for assisting in removal of an individual wire from a connector head. The use of this second tool makes the removal process much more efficient and less painstaking as has been in the past.

An object of the invention is to provide a tool that facilitates the removal process of a wire from an electrical connector.

Another object of the invention is to provide a tool that is simple in design and easy to use.

Another object of the invention is to provide a tool that is easy and inexpensive to manufacture.

Further objects of the invention will become apparent upon a full reading of the specification and inspection of the drawings which follow.

DETAILED DESCRIPTION OF THE DRAWINGS

Figure 1:
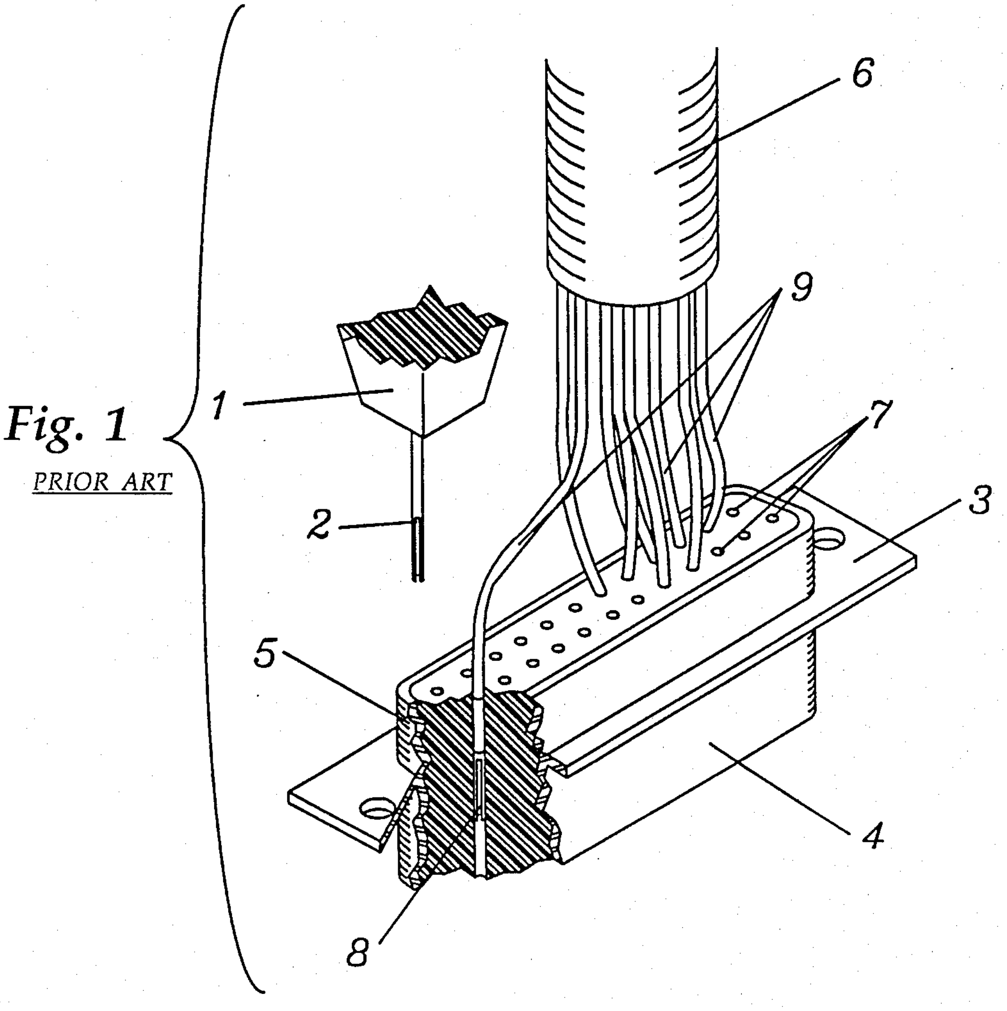
Fig. 1 PRIOR ART
FIG. 1 is a perspective view of an electrical connector head and prior art tool with portions of the connector and tool cut away.

Within the prior art of servicing electrical connectors there has been a widely used tool for removing wires from the receptor holes of these connectors. FIG. 1 shows a view of such a connector and tool. The tool 1 has a hollow shaft 2 which fits over the lead of wire 9. The shaft 2 is split as shown to allow the tool to be slid over the wire 9. The standard connector head 3 has a front side 4 that is generally connected to a computer or other device and a rear side 5 which is connected to a cable 6 via several individual wires 9 extending into receptor bores within the connector head.

Figure 1A:
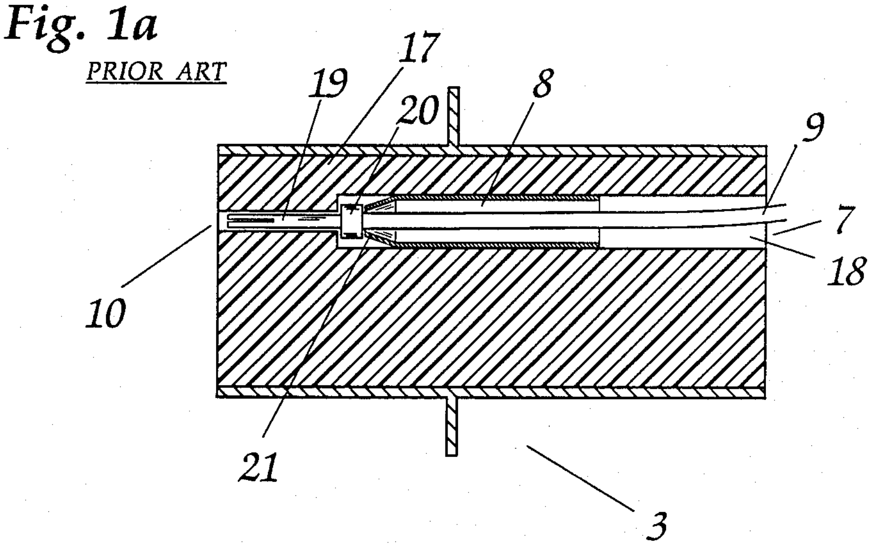
Fig. 1a PRIOR ART
FIG. 1*a* is a cross sectional view along the line A—A of the female connector head of FIG. 1.

FIG. 1*a* shows a detailed cross section of the female connector head 3 of FIG. 1. The connector head includes a body 17 having an opening or bore 7 across the entire width of the connector head. The bore is separated into a narrow front hole 10 and a wide rear hole 18. The wire 9 includes a lead 19 which extends into the narrow front hole 10 as pictured in FIG. 1*a*. the lead 19 comprises a split sleeve at its front end to receive a male lead from a male connector head. The lead 19 also includes an expanded collar 20 that holds the wire 9 stationary within the bore. The collar is held within a second split sleeve 8 that is rigidly connected to the body 17 and includes resilient springs 21 which allow the collar to be pushed inwardly into the bore and snapped past the springs 21, but prevent the lead from being pulled out of the bore as the ends of the springs 21 hold the collar 20 in place.

Figure 1B:
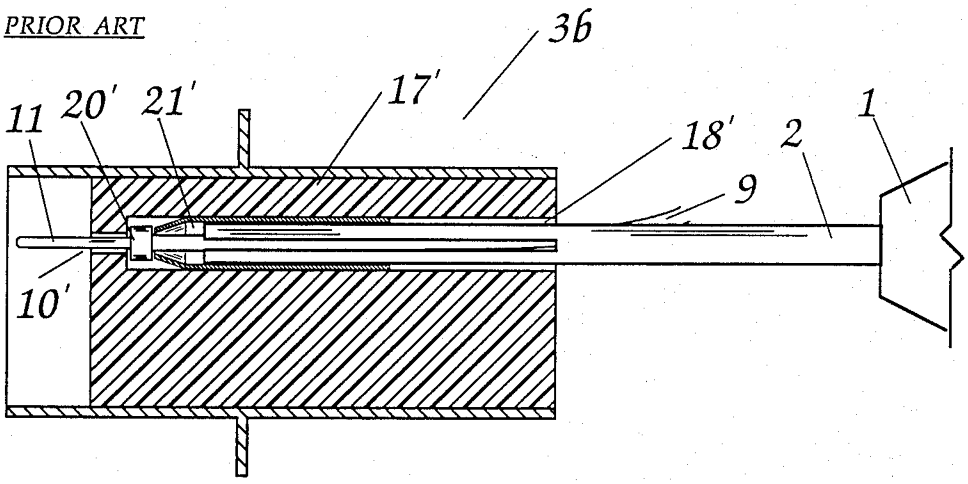
Fig. 1b PRIOR ART
FIG. 1*b* is a crossa sectional view similar to FIG. 1*a* of a prior art male connector head.

The male connector head 3*b* depicted in FIG. 1*b* shows a male lead 11 extending through a narrow hole 10′ of a bore extending through the connector head body 17′. A collar 20′ similar to the collar 20 of FIG. 1*a* is held rigidly within the widened hole 18′ by springs 21′ of sleeve 8′.

FIG. 1*b* shows the prior art tool 1 which removes the lead 11 from the bore. To release the lead the split sleeved shaft 2 is slid over the wire 9 and enters into the widened hole 18′ as shown in FIG. 1*b*. As the shaft is pushed further into the bore, the shaft spreads the springs 21′ apart. The tool is pushed all the way into hole 18′ until the end of the shaft 2 abuts the collar 20′. At this point, the tool is pulled back concurrently with the lead 11 though the frictional engagement of the wire 9 and shaft 2. The collar 20′ is able to clear the ends of the springs 21′ because the shaft 2 has previously spread these springs apart. Thus, the entire wire 9 and lead 11 may be extracted from the connector head 3*b*.

The major problem associated with this prior art extraction process is that the tool often fails to catch the lead end of the wire and when the tool is pulled out of the hole it slips from the end of the wire. The present invention solves this problem by providing a second tool which is inserted into the connector from the opposite or front side of the connector head and effectively pushes out the wire lead.

Figure 2:
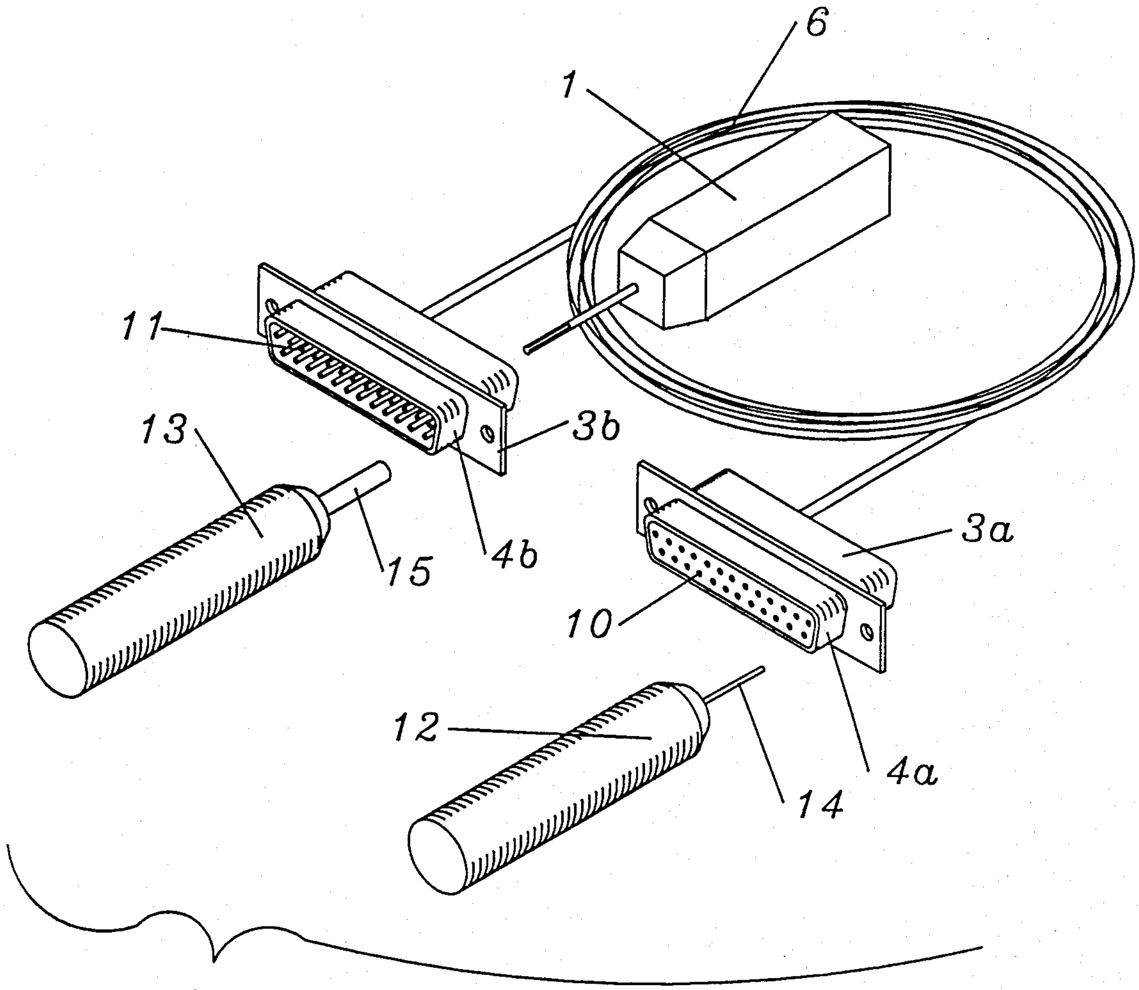
FIG. 2 is a perspective view of the present invention showing both embodiments of the tool for two different types of connector heads.

FIG. 2 clearly shows both embodiments of the second tool. In this case connector 3*a* has a female head or front side 4*a* which has holes 10. The first embodiment of the tool is depicted as tool 12 which has a shaft 14 for insertion into the female connector head through holes 10. The process or method of extracting the wire 9 from the connector head 3*a* involves inserting the extractor tool into the rear side of the connector to remove an individual wire. The second tool 12 is then inserted into the front hole 10 to push the wire lead out from the hole as the tool 1 is pulled from the back hole 7 (as shown in the prior art view of FIG. 1). The use of this second tool makes the extraction process fool proof and can greatly reduce the time involved in removing individual wires from an electrical connector.

Figure 3:
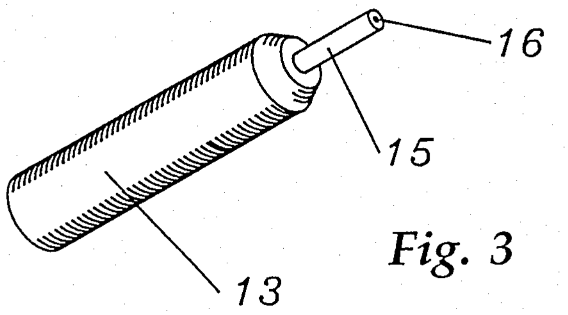
FIG. 3 is another perspective view of one of the embodiments of the tool depicted in FIG. 2.

A second embodiment of the invention involves the tool 13 shown in FIGS. 2 and 3. The tool 13 has a shaft 15 having a hole 16 as best seen in FIG. 3. The extraction process or method is similar to the process described for tool 12 only in this case the tool is used with a male connector head 3*b* that has a front side 4*a* with male leads 11. In this case, the method involves sliding the shaft 15 over the lead 11 to push the wire from the bore 7 (as shown in FIG. 1) as the tool 1 is being pulled outwardly from the rear side of the connector head.

It can be seen that both embodiments of the tool greatly facilitate the extraction process of a wire from an electrical connector. Both tools are simple in design and inexpensive to manufacture. The need for such tools has been present for quite some time. The tools may be adapted for a wide variety of electrical connectors and minor modifications to the tools would be encompassed by the spirit of the present invention. The present invention is submitted not to be limited by the foregoing specification, but is defined by the claims appended hereafter.

What is claimed is:

1. A method for removing a wire from an electrical connector comprising the steps of:

inserting a first tool into a hole of one side of the connector, spreading a sleeve within the hole of the connector with a shaft of said first tool, inserting a second tool into an opposite side of the connector, and pushing said second tool against the end of the wire thereby extracting the wire from the hole of the connector.

2. A method for removing a wire from an electrical connector as claimed in claim 1, wherein, said second tool comprises a shaft and said shaft is inserted into a hole within the opposite side of the connector, said shaft is subsequently pushed against the wire thereby extracting the wire from said connector.

3. A method for removing a wire from an electrical connector as claimed in claim 1, wherein, said second tool comprises a shaft and said shaft comprises a longitudinal hole through said shaft, said shaft is pushed over a male pin of the connector such that the pin enters said longitudinal hole.

said shaft is subsequently pushed into the connector against the wire thereby removing the wire from the connector.

4. A two tool combination for extracting an individual wire from a connector head comprising:

a first tool comprising a handle portion and a shaft portion, said shaft portion being hollow throughout its longitudinal length and including means for allowing the individual wire to be enclosed by said hollow shaft portion, said shaft portion further including an open end for insertion into an opening within the rear side of the connector head;

a second tool comprising a handle portion and a shaft portion, said shaft portion having a free end for applying a pushing force on a lead of the individual wire;

wherein, said shaft portion of said first tool is inserted into a rear hole of the connector head over the individual wire and spreads a catch sleeve of the connector head thereby releasing the back side of the wire lead, and said free end of said second tool, pushes upon the front side of the wire lead and pushes the wire out of the rear hole of the connector head.

5. A two tool combination as claimed in claim 4, wherein, said shaft portion of said second tool comprises a solid cylindrical body, said shaft portion is inserted into a female hole of a connector and pushes the wire lead from the female hole.

6. A two tool combination as claimed in claim 4, wherein, said shaft portion of said second tool comprises a hollow cylindrical body having a longitudinal hole, said shaft portion adapted to slide over the end of a pin of a male connector head and subsequently push the wire lead out of the connector.

* * * * *